US007975081B2

(12) United States Patent
Okada

(10) Patent No.: US 7,975,081 B2
(45) Date of Patent: Jul. 5, 2011

(54) IMAGE DISPLAY SYSTEM AND CONTROL METHOD THEREFOR

(75) Inventor: Kazuhiko Okada, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1114 days.

(21) Appl. No.: 11/336,984

(22) Filed: Jan. 23, 2006

(65) Prior Publication Data

US 2007/0091092 A1 Apr. 26, 2007

(30) Foreign Application Priority Data

Oct. 20, 2005 (JP) ................................ 2005-305877

(51) Int. Cl.
*G06F 3/00* (2006.01)
*G06F 13/00* (2006.01)

(52) U.S. Cl. ................................ 710/30; 710/8; 710/52

(58) Field of Classification Search ........................ None
See application file for complete search history.

(56) References Cited

U.S. PATENT DOCUMENTS

| | | | | |
|---|---|---|---|---|
| 6,580,435 | B1 | 6/2003 | Lippincott | |
| 2002/0140817 | A1 * | 10/2002 | Biagiotti et al. | 348/180 |

FOREIGN PATENT DOCUMENTS

| | | | |
|---|---|---|---|
| JP | 5-158447 | A | 6/1993 |
| JP | 10-49125 | A | 2/1998 |
| JP | 10-161638 | | 6/1998 |
| JP | 10-177374 | A | 6/1998 |
| JP | 11-168610 | A | 6/1999 |
| JP | 11-254762 | A | 9/1999 |
| JP | 2003-288071 | A | 10/2003 |
| KR | 10-2004-0086399 | | 10/2004 |
| TW | 2004-04454 | A | 3/2004 |
| WO | WO 03-071518 | A2 | 8/2003 |
| WO | WO 2004/015680 | A1 | 2/2004 |

OTHER PUBLICATIONS

Riekert, Wolf-Fritz, Extracting area objects from raster image data, Mar. 1993, ieeexplore.org [Online, accessed on Feb. 12, 2011], URL:http://ieeexplore.ieee.org/xpls/abs_all.jsp?arnumber=204969 &tag=1.*

* cited by examiner

*Primary Examiner* — Tariq Hafiz
*Assistant Examiner* — Scott Sun
(74) *Attorney, Agent, or Firm* — Arent Fox, LLP

(57) ABSTRACT

Provided are an image display system and a control method for the image display system capable of displaying an image, which is represented by raster image data to be transferred through burst transmission and which is formed with a plurality of scanning lines, through simple control. An image display system includes a plurality of FIFO memories numbering the same as scanning lines in which pixels to be transferred during one burst transmission are contained do, and an input control unit that selects one of the plurality of FIFO memories according to a line number assigned to a line of pixels corresponding to unit transfer data, and stores second raster image data in the selected FIFO memory.

12 Claims, 10 Drawing Sheets

FLOW OF FONT DATA IN IMAGE DISPLAY SYSTEM

CIRCUITRY OF IMAGE DISPLAY SYSTEM IN ACCORDANCE WITH PRESENT EMBODIMENT

RELATIONSHIP OF FRAME IMAGE TO RASTER IMAGE TO BE SUPERIMPOSED ON FRAME IMAGE

FIG.4

EXAMPLE OF DATA ITEMS LISTED IN ARRANGEMENT DATA TABLE

| COORDINATES (X,Y) | FONT DATA NUMBER (FN) | LINE NUMBER (LN) | HORIZONTAL SIZE (HS) | LEADING ADDRESS (ADS) |
|---|---|---|---|---|
| (12,8) | 0 | 0 | 8 | 0 |
| (50,8) | 1 | 0 | 16 | 64 |
| (12,9) | 0 | 1 | 8 | 0 |
| (50,9) | 1 | 1 | 16 | 64 |
| (12,10) | 0 | 2 | 8 | 0 |
| (50,10) | 1 | 2 | 16 | 64 |
| (12,11) | 0 | 3 | 8 | 0 |
| (50,11) | 1 | 3 | 16 | 64 |
| (12,12) | 0 | 4 | 8 | 0 |
| (50,12) | 1 | 4 | 16 | 64 |
| (80,12) | 2 | 0 | 8 | 192 |
| (12,13) | 0 | 5 | 8 | 0 |
| (50,13) | 1 | 5 | 16 | 64 |
| (80,13) | 2 | 1 | 8 | 192 |
| (12,14) | 0 | 6 | 8 | 0 |
| (50,14) | 1 | 6 | 16 | 64 |
| (80,14) | 2 | 2 | 8 | 192 |
| (12,15) | 0 | 7 | 8 | 0 |
| (50,15) | 1 | 7 | 16 | 64 |
| (80,15) | 2 | 3 | 8 | 192 |
| (80,16) | 2 | 4 | 8 | 192 |
| (80,17) | 2 | 5 | 8 | 192 |
| (80,18) | 2 | 6 | 8 | 192 |
| (80,19) | 2 | 7 | 8 | 192 |

TIMINGS OF BURST TRANSMISSION OF FONT DATA OF EIGHT PIXELS LONG

TIMINGS OF BURST TRANSMISSION OF FONT DATA OF SIXTEEN PIXELS LONG

RELATIONSHIP AMONG SYNC SIGNALS VSYNC AND HSYNC AND COUNT VALUE

FLOW OF FONT DATA IN IMAGE DISPLAY SYSTEM

IMAGE DISPLAY SYSTEM AND CONTROL METHOD THEREFOR

CROSS-REFERENCE TO RELATED APPLICATIONS

This application is based upon and claims the benefit of priority from the prior Japanese Patent Application No. 2005-305877 filed on Oct. 20, 2005, the entire contents of which are incorporated herein by reference.

BACKGROUND OF THE INVENTION

1. Field of the Invention

The present invention relates to an image display system, or more particularly, to an image display system for displaying a raster image such as outline fonts or picture data while superimposing it on part of a frame image.

2. Description of the Related Art

In image display systems, while the picture area is scanned in order to display a frame image, a raster image such as outline fonts or picture data must be transferred from a memory, in which the raster image is stored in advance, within a predetermined period of time. The predetermined period of time is determined based on a frame frequency or a resolution. If the transfer of the raster image is not completed within the predetermined period of time, the raster image is not correctly superimposed on a frame image. Therefore, the time required for transfer of the raster image must be shortened.

An image display system disclosed in Japanese Unexamined Patent Publication No. H10(1998)-161638 includes a font data conversion circuit 122 and a font data address production circuit 123. A video memory 136 includes a video memory plane 103. In response to an output of a scanning line count means that indicates a scanning line in which characters are contained for display, the video memory plane 103 is accessed via a memory interface 124 in order to read character text codes, which are contained in respective scanning lines, sequentially from successive spaces. Font data that is display data is then transferred, and an image signal is finally transmitted from a display circuit 125 to a cathode-ray tube (CRT).

Consequently, even if characters to be displayed while being contained in the same scanning line are represented by character codes whose locations are separated from one another, since font data is stored in a video memory area of 256 bytes long in units of pixels to be contained in a scanning line, the font data can be transferred owing to the feature of a DRAM permitting fast access. Eventually, the time required for transfer can be shortened.

SUMMARY OF THE INVENTION

In the image display system according to the Japanese Unexamined Patent Publication No. H10(1998)-161638, if a synchronized dynamic random access memory (SDRAM) is adopted as a memory in which font data is stored, a problem occurs.

Specifically, in the image display system according to the Japanese Unexamined Patent Publication No. H10(1998)-161638, since pixels included in font data and stored at successive addresses are those to be contained in one scanning line, the amount of font data to be transferred during one burst transmission is limited to that to be contained in one scanning line. If the amount of font data to be contained in one scanning line is small, the length of one burst is short and a throughput is degraded.

Furthermore, in the image display system described in the Japanese Unexamined Patent Publication No. H10(1998)-161638, the video memory plane 103 having the same storage capacity as a video memory plane 102 in which font data items are stored must be created in a space different from a space in which the video memory plane 102 is created. Therefore, the size of the video memory becomes large. Eventually, the circuitry of the image display system becomes large in scale.

In a typical device that supports burst transmission, a first-in first-out (FIFO) memory is adopted as a memory serving as a destination of the burst transmission. Assuming that the FIFO memory is adopted as the memory which serves as the destination of the burst transmission and which is included in an image display system that displays a raster image while superimposing it on a frame memory, the image display system will be discussed below.

In the image display system using FIFO memories, when pixels to be contained in one scanning line is transferred during each burst transmission, lines of pixels are stored in the FIFO memories in the same order that the scanning lines forming a frame image are transmitted. Consequently, the lines of pixels are fetched from the FIFO memories in the same order that they are stored. Thus, characters or the like are displayed while being accurately superimposed on the frame image.

If a plurality of lines of pixels are transferred during each burst transmission, the plurality of lines of pixels are successively stored in the FIFO memories. The order that the lines of pixels are stored in the FIFO memories is not agreed with the sequence of scanning lines forming a frame image. Therefore, even if the lines of pixels are fetched from the FIFO memories in the same order that they are stored, characters or the like cannot be displayed while being accurately superimposed on the frame image. In order to accurately display the characters, measures must be taken, for example, the lines of pixels fetched from the FIFO memories must be resorted in the same order as the sequence of scanning lines forming the frame image. Consequently, control of the FIFO memories becomes complex. Eventually, the image display system becomes complex.

The present invention addresses the problems underlying the background art. An object of the present invention is to provide an image display system and a control method therefor making it possible to improve a throughput of burst transmission from SDRAMs and to simplify control of FIFO memories.

To achieve the above object, according to a first aspect of the invention, there is provided an image display system in which a plurality of unit transfer data items each of which corresponds to a line of pixels that is contained in one scanning line and that is included in second raster image data to be superimposed on part of first raster image data which represents an image to be displayed during one frame, or corresponds to one of n portions into which the line of pixels is divided are transferred based on an input enabling signal through burst transmission, comprising: FIFO memories numbering the same as scanning lines in which pixels to be transferred during one burst transmission are contained do; and an input control unit that stores the unit transfer data in the FIFO memory selected based on a line number assigned to a line of pixels to be contained in one scanning line.

According to another aspect of the invention, there is provided a control method for an image display system comprising the steps of: transferring a plurality of unit transfer data items, each of which corresponds to a line of pixels that is contained in one scanning line and that is included in second raster image data to be superimposed on part of first raster image data which represents an image to be displayed during one frame, or corresponds to one of n portions into which the line of pixels is divided, through burst transmission; and storing the unit transfer data items in the same number of FIFO memories as the number of scanning lines to be transferred during one burst transmission, wherein: the FIFO memory is selected with a line number assigned to a line of pixels included in the second raster image data and contained in one scanning line.

In image display according to the present invention, unit transfer data is stored in a FIFO memory, which is selected based on a line number assigned to a line of pixels, through burst transmission. When a plurality of lines of pixels are stored in FIFO memories during one burst transmission, the unit transfer data is stored in the FIFO memory associated with the line number assigned to a line of pixels to be contained in a scanning line. When an image is displayed while being superimposed on an image represented by first raster image data, a FIFO memory associated with the line number assigned to a line of pixels to be transferred is selected for the purpose of accurate display. According to the present invention, an image display system includes the FIFO memories as a means in each of which unit transfer data is stored, and can display an image while accurately superimposing it on an image represented by the first raster image data without the necessity of complex control, that is, the necessity of resorting lines of pixels fetched from the FIFO memories.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 4 shows an example of data items listed in an arrangement data table;

DETAILED DESCRIPTION OF THE PREFERRED EMBODIMENTS

Referring to FIG. 1 to FIG. 10, an example of an embodiment of the present invention will be described below.

Figure 1:
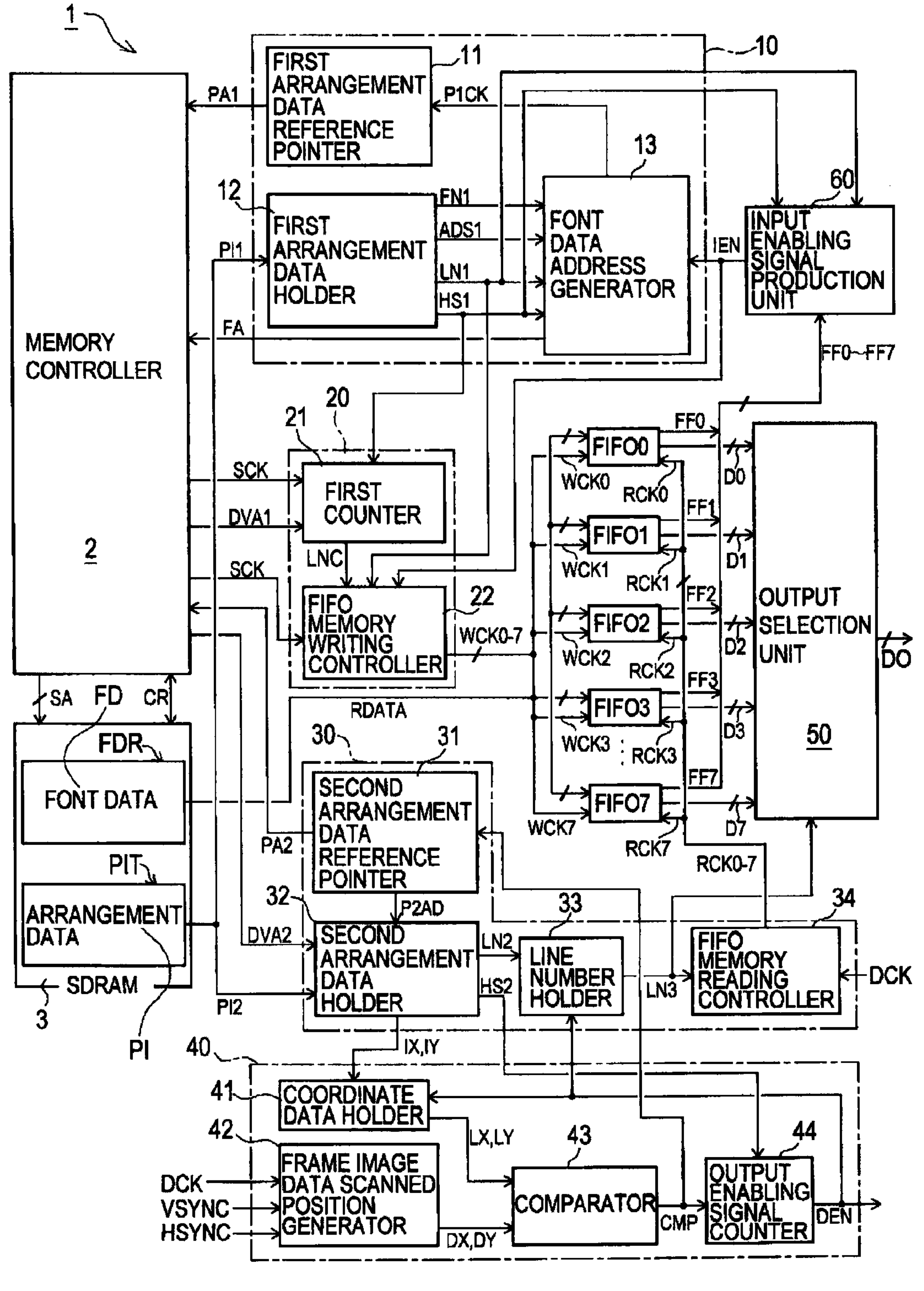
FIG. 1 is a circuit block diagram showing the circuitry of an image display system in accordance with an embodiment.

FIG. 1 is a circuit block diagram showing an image display system 1 that is an example of the present invention.

The image display system 1 superimposes characters, which are represented by font data FD and which are regarded as a raster image, on part of a frame image FP, which is a raster image, according to predetermined arrangement data PI.

Prior to the description of the image display system 1, the frame image FP, font data items FD0 to FD2, and arrangement data PI will be described below.

Figure 2:
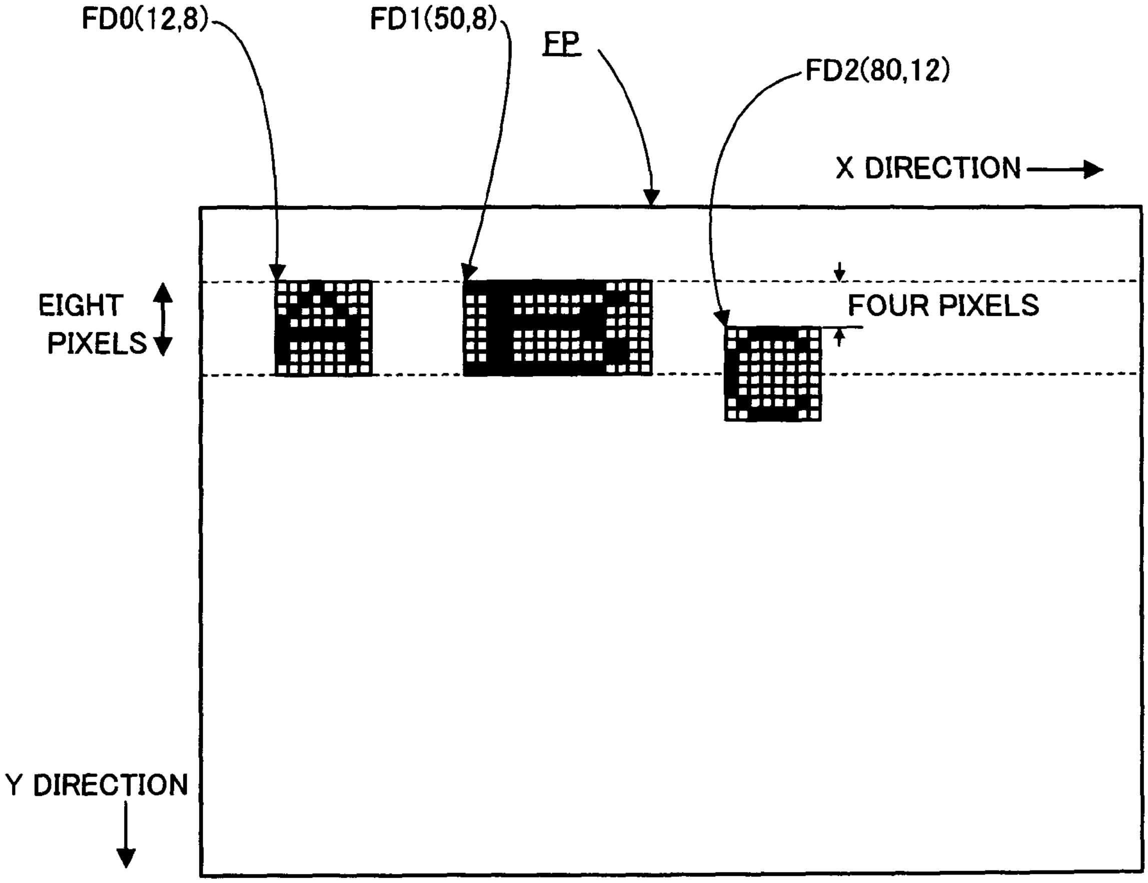
FIG. 2 shows the relationship of a frame image to a raster image to be superimposed on the frame image.

FIG. 2 shows an example of the font data items FD0 to FD2 that represent characters to be superimposed on part of the frame image FP. The font data items FD0 to FD2 are raster image data items each of which has one pixel thereof realized with one byte. The font data FD0 is raster image data of eight bytes long and eight bytes high representing character A. The font data FD1 is raster image data of sixteen bytes long and eight bytes high representing character B. The font data FD2 is raster image data of eight bytes long and eight bytes high representing character C. Numerals in parentheses succeeding FD0, FD1, or FD2 in the drawing are coordinates representing a position at which the character is disposed. For example, (12,8) succeeding FD0 signifies that the character represented by the font data FD0 is disposed at a position represented by the x-coordinate of 12 in a horizontal direction and the y-coordinate of 8 in a vertical direction. The x-coordinate and y-coordinate can be designated in units of 1. In the example shown in FIG. 2, the character represented by the font data FD2 is located at a position deviated from the positions of the characters represented by the font data items FD0 and FD1 respectively by 4 in the vertical direction.

Figure 3:
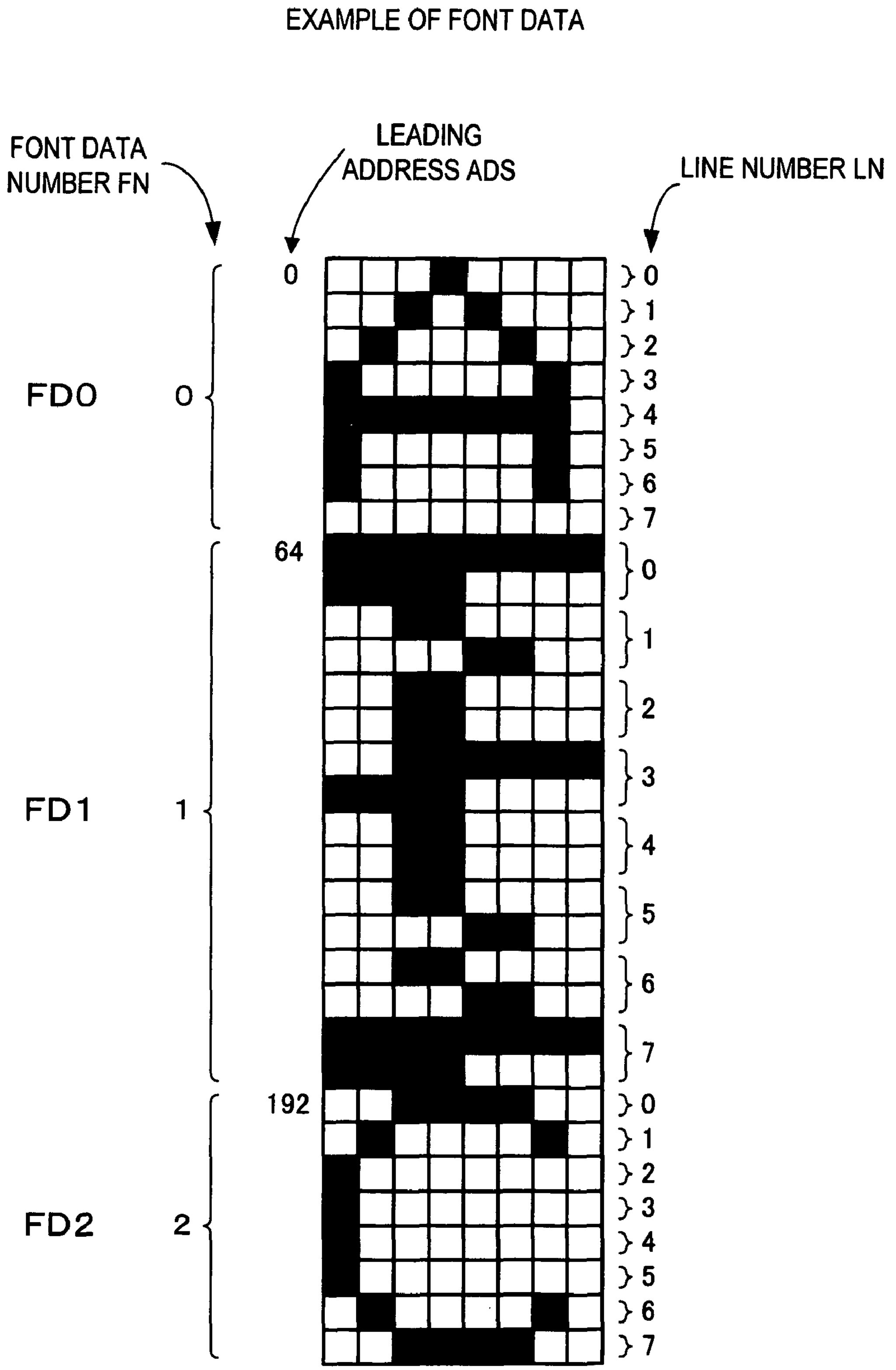
FIG. 3 shows an example of font data.

The font data items FD are transferred from a font data area FDR in a synchronized dynamic random access memory (SDRAM) 3 that will be described later. As shown in FIG. 3, the font data items FD are stored in the font data area FDR in ascending order of a font data number FN. Each font data has lines of pixels arranged in ascending order of a line number. The font data items FD are assigned different font data numbers FN. In the present embodiment, 0 is assigned as a font data number FN to the font data FD0, 1 is assigned as the font data number FN to the font data FD1, and 2 is assigned as the font data number FN to the font data FD2. Each font data FD has lines of pixels assigned line numbers LN. The font data FD0 or FD2 has the lines of eight pixels assigned different line numbers LN. The font data FD1 has the lines of sixteen pixels assigned different line numbers LN.

In the image display system 1 according to the present embodiment, a data rate is four bytes (32 bits), and the length of a burst is fixed to eight words. Consequently, 32 bytes of font data FD are transferred during each burst transmission.

Next, arrangement data PI based on which characters represented by font data items are arranged on a frame image FP will be described below.

The arrangement data PI specifies coordinates (X,Y), a font number FN, a line number LN, a horizontal size HS of a font, and a leading address ADS in a storage area, in which font data is stored, in association with each line of pixels included in each font data. As shown in FIG. 4, the arrangement data items PI are organized as an arrangement data table PIT while being listed in ascending order of coordinates (X,Y), that is, in the sequence of scanning lines forming a frame image FP. In other words, the arrangement data PI specifying a smaller y-coordinate is listed near the leading position in the arrangement data table PIT. When the arrangement data items share the same y-coordinate, the arrangement data specifying a smaller x-coordinate is listed near the leading position.

Figure 5:
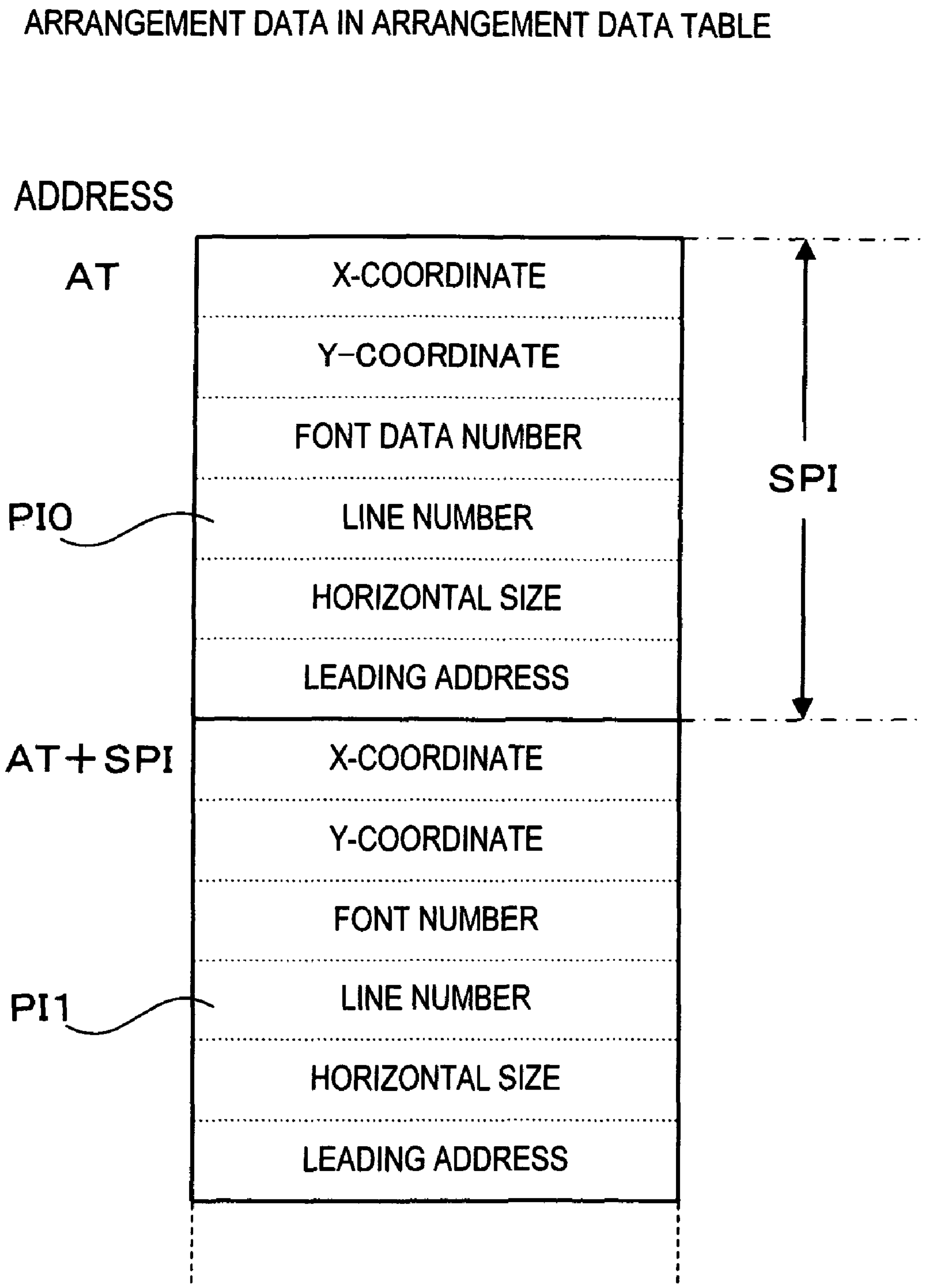
FIG. 5 shows the structure of arrangement data in the arrangement data table.

In the present embodiment, the arrangement data table PIT is stored in a continuous area in the SDRAM 3. As shown in FIG. 5, one arrangement data PI specifies coordinates (X,Y), a font number FN, a line number LN, a horizontal size HS, and a leading address ADS. The arrangement data items PI are listed based on their coordinates (X,Y) in association with the scanning lines rendering a frame image FP. Moreover, a difference between addresses is equal to an arrangement data size SPI that is the size of an area occupied by one arrangement data PI. Namely, as shown in FIG. 5, assuming that arrangement data PI at the leading address in the arrangement data table PIT is PI0 and the leading address is AT, the address of the next arrangement data PI is provided as the sum of the leading address AT and the arrangement data size SPI.

Referring back to FIG. 1, the components of the image display system 1 will be described below. The SDRAM 3 is connected to the image display system 1 via a memory controller 2. The image display system 1 transmits output data DO of 32 bits long together with an output enabling signal DEN. The output data DO is divided in to pixels by a shift circuit that is not shown, and superimposed on part of data of a frame image FP.

Furthermore, the image display system 1 includes: FIFO memories 0 to 7; a font data address generation unit 10 that produces a transfer start address from which font data FD is transferred from the SDRAM 3 through burst transmission; an input control unit 20 that controls writing of data in the FIFO memories 0 to 7; an output control unit 30 that controls reading of data from the FIFO memories 0 to 7; a synchronizing (sync) control unit 40 that synchronizes a frame image with an image represented by the output data DO; an output selection unit 50 that selects one of the outputs of the FIFO memories 0 to 7 and provides the output data DO; and an input enabling signal production unit 60 that produces an input enabling signal IEN.

The font data address generation unit 10 includes a first arrangement data reference pointer 11, a first arrangement data holder 12, and a font data address generator 13.

The first arrangement data reference pointer 11 transmits an address PA1, from which the first arrangement data PI1 needed to transfer font data from the SDRAM 3 to the FIFO memories 0 to 7 through burst transmission is read, to the memory controller 2. The initial value of the address PA1 is the leading address AT in the arrangement data table PIT. Every time a first count command signal PICK is received from the font data address generator 13, the arrangement data size SPI is added to the initial value of the address PA1 and then transmitted. The memory controller 2 transmits the address SA whose leading address corresponds to the address PA1, and accesses the arrangement data PI in the SDRAM 3. Consequently, data whose leading address corresponds to the address PA1 and whose size corresponds to the arrangement data size SPI is transferred from the SDRAM 3 to the image display system 1.

The first arrangement data holder 12 samples a font data number FN, a line number LN, a horizontal size HS, and a leading address ADS from the first arrangement data PI1 sent from the SDRAM 3 and located at the address PA1, and holds them. The held data items or elements are transmitted as the first font data number FN1, first line number LN1, first horizontal size HS1, and first leading address ADS1.

The font data address generator 13 receives the first font data number FN1, first line number LN1, first horizontal size HS1, first leading address ADS1, and input enabling signal IEN, and transmits a font data address FA and a first count command signal P1CK.

The font data address FA is a leading address at which leading font data to be transmitted from the SDRAM 3 through burst transmission is located, and which is transmitted for every burst transmission. The font data address generator 13 determines based on the line number LN and horizontal size HS whether font data to be transferred is leading data to be transferred first during burst transmission. If the font data is the leading data, the font data address FA is transmitted. According to the present embodiment, the length of a burst is fixed to eight words and 32 pixels (equal to 32 bytes) are transferred during each burst transmission. Therefore, a line of pixels having a leading line number LN among 32 pixels included in font data is regarded as the leading data to be transferred first during burst transmission. For example, when font data is eight pixels long in the direction of scanning lines, pixels to be contained in four scanning lines are transferred during each burst transmission. Therefore, a line of pixels whose line number LN is 0 or 4 is regarded as the leading data of burst transmission. On the other hand, when font data is sixteen pixels long in the direction of scanning lines, pixels to be contained in two scanning lines are transferred during each burst transmission. Consequently, a line of pixels whose line number LN is 0, 2, 4, or 6 is regarded as the leading data of burst transmission.

The font data address FA is calculated by adding the leading address AFD of the font data area FDR to the first leading address ADS1.

The input enabling signal production unit 60 receives the FIFO memory full signals FF0 to FF7 sent from the FIFO memories 0 to 7 respectively, the first line number LN1, and the first horizontal size HS1, and transmits the input enabling signal IEN. If the FIFO memories 0 to 7 do not have a remaining storage capacity large enough to perform burst transmission, the FIFO memory full signals FF0 to FF7 are activated. The input enabling signal production unit 60 determines based on the FIFO memory full signals FF0 to FF7 whether the FIFO memories 0 to 7 have a storage capacity large enough to perform burst transmission, and activates the input enabling signal IEN with which burst transmission from the SDRAM 3 is enabled. When one of the FIFO memory full signals concerning the FIFO memories that are destinations of burst transmission is activated, the input enabling signal IEN is inactivated. When the FIFO memory full signal concerning the FIFO memory which is one of the destinations of burst transmission and in which data to be contained in the last scanning line is stored is inactivated, the input enabling signal IEN is activated. In other words, the input enabling signal IEN is activated based on one of the FIFO memory full signals FF0 to FF7 that is selected according to the first line number LN1 and first horizontal size HS1 that specify a line of pixels serving as an object of burst transmission.

For example, when font data is eight pixels long in the direction of scanning lines, pixels to be contained in four scanning lines are transferred during each burst transmission. Consequently, when the FIFO memory full signals FF0 to FF3 (or FF4 to FF7) are activated, the input enabling signal IEN is activated. Moreover, a line of pixels whose line number LN is 3 (or 7) is regarded as last data to be transferred during burst transmission. Therefore, when the FIFO memory full signal FF3 (or FF7) is inactivated, the input enabling signal IEN is activated.

On the other hand, when font data is sixteen pixels long in the direction of scanning lines, pixels to be contained in two scanning lines are transferred during each burst transmission. Consequently, when the FIFO memory full signals FF0 and FF1 (or FF2 and FF3, FF4 and FF5, or FF6 and FF7) are activated, the input enabling signal IEN is activated. Moreover, since a line of pixels whose line number LN is 1 (or 3, 5, or 7) is regarded as the last data to be transferred last during burst transmission, when the FIFO memory full signal FF1 (or FF3, FF5, or FF7) is inactivated, the input enabling signal IEN is activated.

Next, the input control unit 20 will be described below.

The input control unit 20 includes a first font line value counter 21 whose count value is incremented with every transfer of a line of pixels of font data to be contained in one scanning line, and a FIFO memory writing controller 22 that controls writing of data in the FIFO memories, in which font data items received from the SDRAM 3 are stored, according to the count value of the first counter 21.

The first counter 21 receives the first horizontal size HS1 and a data transfer clock SCK, and transmits a line count value LNC that is the result of counting. The line count value LNC is initialized to 0 for every burst transmission, and incremented with every input of a line of pixels of font data to be contained in one scanning line. Four pixels are transferred synchronously with a data transfer clock SCK. When a large number of data transfer clocks SCK that is large enough to transmit the number of pixels included in font data equivalent to the first horizontal size HS1 is received, the line count value LNC is incremented. In other words, the line count value LNC is incremented in units of a size ratio HSV that is a quotient of the first horizontal size HS1 of font data FD by four pixels that is a data rate of burst transmission. The size ratio HSV is calculated by a two-bit right shift circuit that is not shown and associated with the first horizontal size HS1.

For example, when font data is eight pixels long in the direction of scanning lines, the size ratio HSV is 2. Therefore, the line count value LNC is incremented synchronously with every other data transfer clock SCK. On the other hand, when font data is sixteen pixels long in the direction of scanning lines, the size ratio HSV is 4. The line count value LNC is therefore incremented synchronously with every fourth data transfer clock SCK.

Figure 6:
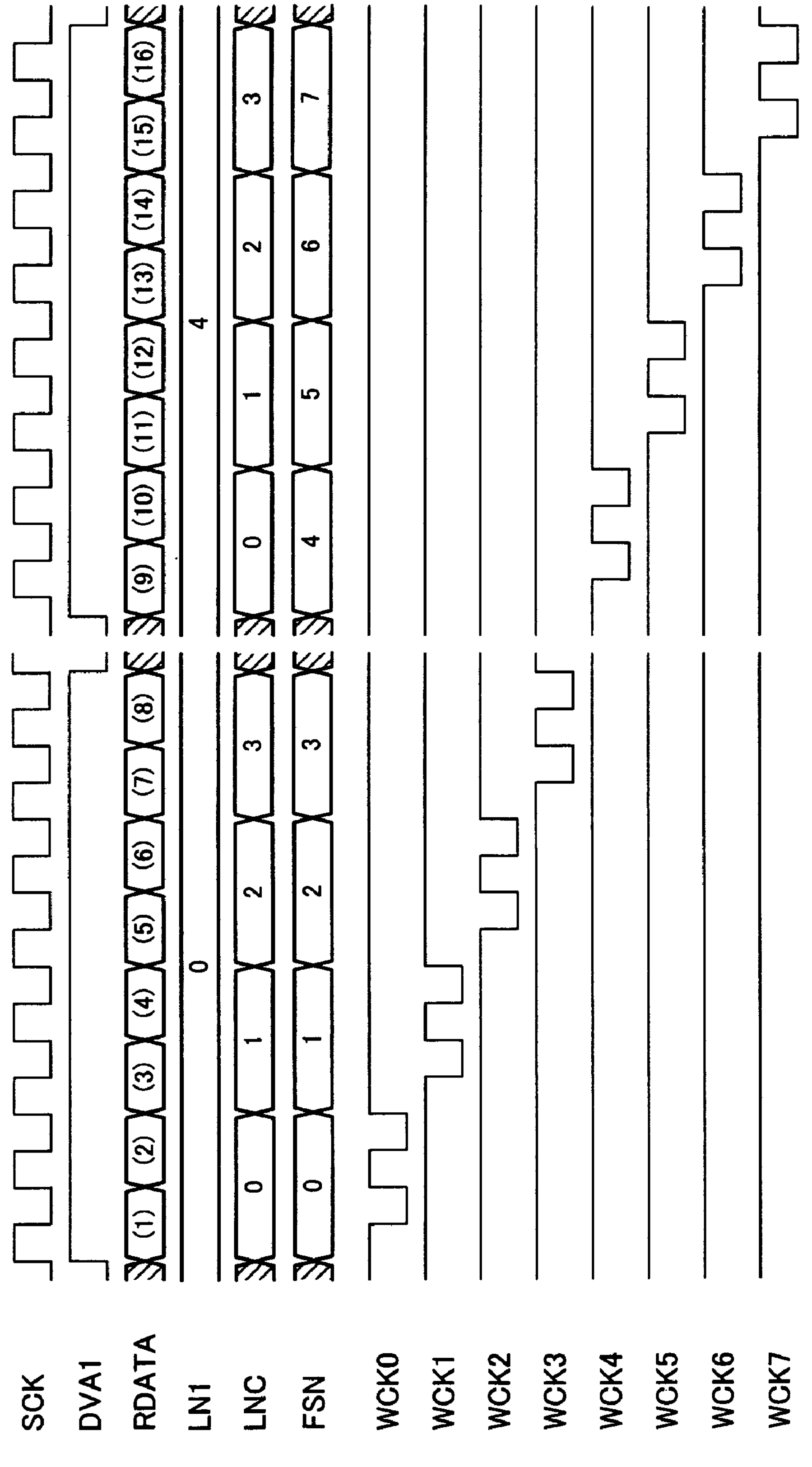
FIG. 6 is a timing chart indicating timings of burst transmission of font data of eight pixels long.
Figure 7:
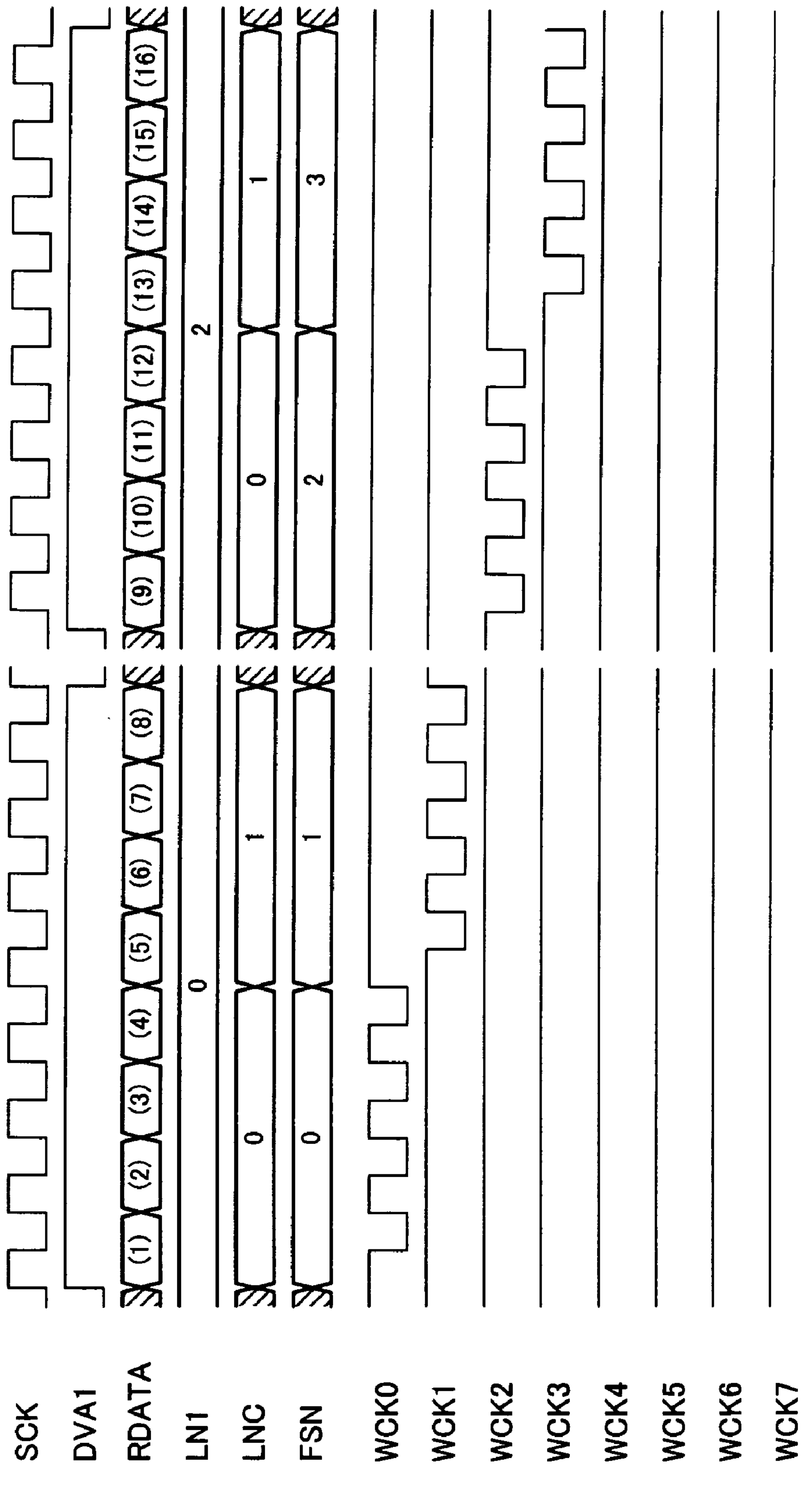
FIG. 7 is a timing chart indicating timings of burst transmission of font data of sixteen pixels long.

The FIFO memory writing controller 22 receives the first line number LN1, line count value LNC, input enabling signal IEN, and data transfer clock SCK, and transmits one of write signals WCK0 to WCK7 which instruct writing of data in the respectively FIFO memories 0 to 7. As shown in FIG. 6 and FIG. 7, the FIFO memory writing controller 22 calculates a selective FIFO memory number FSN by adding the line count value LNC to the first line number LN1, and transmits the write signal WCKn, of which timing is determined with the timing of the data transfer clock SCK, to one of the FIFO memories selected based on the selective FIFO memory number FSN.

Next, burst transmission of font data FD will be described with reference to FIG. 6 and FIG. 7.

FIG. 6 is a timing chart indicating the timings of burst transmission of font data FD0 having lines of eight pixels thereof contained in respective scanning lines.

The font data FD0 has the pixels thereof, which are contained in four scanning lines, transferred to the respective FIFO memories during each burst transmission. For example, pixels to be transferred at the timings (1) and (2) and contained in a scanning line belong to a line of pixels whose line number LN is 0. Likewise, a line of pixels to be contained in one scanning line is transferred at two timings out of timings (3) to (16).

Moreover, since the size ratio HSV is 2, the count value of the first counter 21 is updated synchronously with every other data transfer clock SCK. The count value of the first counter 21 is therefore updated at the timings (3), (5), (7), (9), (11), (13), and (15).

At the timing (1), the first line number LN1 is 0, the first counter 21 is initialized, and the line count value LNC is 0. Consequently, the selective FIFO memory number FSN is set to 0, and negative pulses that are in phase with the data transfer clocks SCK are transmitted as the write signal WCK0 which instructs writing of data in the FIFO memory 0. Consequently, the unit transfer data items RDATA are stored in the FIFO memory 0.

At the timing (2), the count value of the first counter 21 is not updated, and the line count value LNC remains 0. Consequently, the selective FIFO memory number FSN remains 0. The negative pulses that are in phase with the data transfer clocks SCK are transmitted as the write signal WCK0 which instructs writing of data in the FIFO memory 0. Consequently, the unit transfer data items RDATA are stored in the FIFO memory 0.

At the timing (3), the count value of the first counter 21 is updated, and the line count value LNC becomes 1. Consequently, the selective FIFO memory number FSN is set to 1. Negative pulses that are in phase with the data transfer clocks SCK are transmitted as the write signal WCK1 which instructs writing of data in the FIFO memory 1. Consequently, the unit transfer data items RDATA are stored in the FIFO memory 1. At the timings (4) to (8), the selective FIFO memory number FSN is determined based on the line count value LNC, and negative pulses are transmitted as the write signal WCKn which instructs writing of data in the FIFO memory selected based on the selective FIFO memory number FSN.

At the timings (9) to (16), the first line number LN1 is set to 4, and the selective FIFO memory number FSN is determined by adding 4 to the line count value LNC. Negative pulses are transmitted as the write signal WCKn to the FIFO memory selected based on the selective FIFO memory number FSN.

FIG. 7 is a timing chart indicating timings of burst transmission of font data FD1 that has lines of sixteen pixels thereof contained in respective scanning lines.

The font data FD1 has the pixels thereof, which are contained in two scanning lines, transferred during each burst transmission, and is then stored in the FIFO memories. For example, pixels to be transferred at the timings (1) to (4) and contained in a scanning line belong to a line of pixels whose line number LN is 0. Likewise, pixels contained in one scanning line are transferred at four timings out of the timings (5) to (16).

Moreover, since the size ratio HSV is 4, the count value of the first counter 21 is transferred synchronously with every fourth data transfer clock SCK. In other words, the count value of the first counter 21 is updated at the timings (5), (9), and (13).

At the timing (1), the first line number LN1 is 0, the first counter 21 is initialized, and the line count value LNC is 0. Consequently, the selective FIFO memory number FSN is set to 0. A negative pulse that is in phase with the data transfer clock SCK is transmitted as the write signal WCK0 which instructs writing of data in the FIFO memory 0. Therefore, the unit transfer data RDATA is stored in the FIFO memory 0. At the timings (2) to (4), similarly to the timing (1), a negative pulse that is in phase with the data transfer clock SCK is transmitted as the write signal WCK0 which instructs writing of data in the FIFO memory 0. Consequently, the unit transfer data RDATA is stored in the FIFO memory 0.

At the timing (5), the count value of the first counter 21 is updated, and the line count value LNC is set to 1. Consequently, the selective FIFO memory number FSN is set to 1. A negative pulse that is in phase with the data transfer clock SCK is transmitted as the write signal WCK1 that instructs writing of data in the FIFO memory 1. Consequently, the unit transfer data RDATA is stored in the FIFO memory 1. At the timings (6) to (8), similarly to the timing (5), a negative pulse that is in phase with the data transfer clock SCK is transmitted as the write signal WCK1 that instructs writing of data in the FIFO memory 1. Eventually, the unit transfer data RDATA is stored in the FIFO memory 1.

At the timings (9) to (16), the first line number LN is set to 2, and the selective FIFO memory number FSN is determined by adding 2 to the line count value LNC. A negative pulse is then transmitted as the write signal WCKn that instructs writing of data in the FIFO memory selected based on the selective FIFO memory number FSN.

Next, the output control unit 30 will be described below.

The output control unit 30 includes a second arrangement data reference pointer 31, a second arrangement data holder 32, a line number holder 33, and a FIFO memory reading controller 34.

The second arrangement data reference pointer 31 transmits an address SA2, from which second arrangement data PI2 needed to transfer data from the SDRAM 3 to the FIFO memories 0 to 7 through burst transmission is read, to the memory controller 2. Every time the vertical sync signal VSYNC is driven low, the leading address AT of the arrangement data table PIT is initialized. The arrangement data size SP1 is added to the initialized leading address AT in response to each consistence signal CMP sent from a comparator 43 that will be described later. The resultant value is transmitted as the address SA2. The memory controller 2 transmits the address SA and accesses the arrangement data PI in the SDRAM 3. Consequently, data whose leading address corresponds to the address PA2 and whose size corresponds to the arrangement data size SPI is transferred from the SDRAM 3 to the image display system 1.

The second arrangement data holder 32 samples coordinates (X,Y), a line number LN, and a horizontal size HS from the arrangement data PI located at the address PA2 in the SDRAM 3, and holds them. The held data items or elements are transmitted as the coordinates (IX,IY), second line number LN2, and second horizontal size HS2.

While an output enabling signal DEN that will be described later remains high, the line number holder 33 holds the second line number LN2 and transmits the third line number LN3.

The FIFO memory reading controller 34 transmits one of read signals RCK0 to RCK7, which instructs reading of data from the FIFO memories 0 to 7, according to the received third line number LN3, and controls reading of data from a FIFO memory. Since output data DO read from the FIFO memory is of four pixels long, four pixels can be transmitted during each reading. Consequently, any of the read signals RCK0 to RCK7 is transmitted synchronously with every fourth display clock DCK.

Next, the sync control unit 40 will be described below. The sync control unit 40 includes a coordinate data holder 41 that holds coordinates (IX, IY) sent from the second arrangement data holder 32, a frame image data scanned position generator 42 that detects a scanned position from sync signals used to produce a frame image FP, a comparator 43 that compares the output of the coordinate data holder 41 with the output of the frame image data scanned position generator 42, and an output enabling signal counter 44 that transmits an output enabling signal DEN at the timing determined by the comparator 43.

Every time a consistence signal CMP sent from the comparator 43 is activated, the coordinate data holder 41 holds the coordinates (IX, IY) and transmits them as coordinates (LX, LY) The frame image data scanned position generator 42 receives a display clock DCK, a vertical sync signal VSYNC, and a horizontal sync signal HSYNC that are sync signals used to produce a frame image FP, and detects a current scanned position in the frame image FP. The frame image data scanned position generator 42 includes a vertical (V) counter that counts the number of times a specific cycle is repeated so as to detect a position in a vertical direction, and a horizontal (H) counter that counts the number of times a specific cycle is repeated so as to detect a position in a horizontal direction, though both the counters are not shown.

Figure 8:
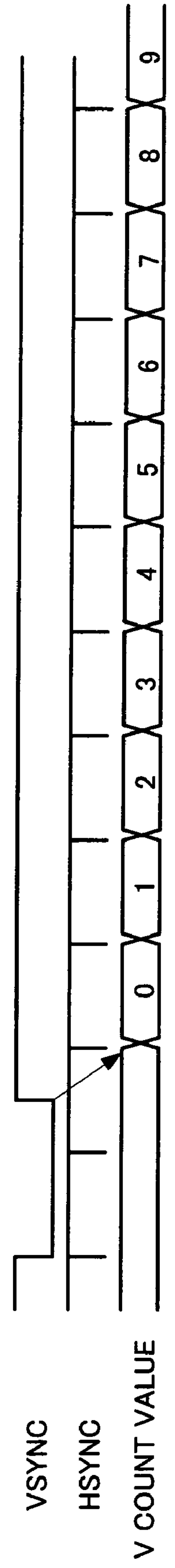
FIG. 8 is a timing chart indicating the relationship among a vertical synchronizing (sync) signal VSYNC, a horizontal sync signal HSYNC, and a V counter value.

The V counter is, as shown in FIG. 8, reset when the vertical sync signal VSYNC is driven low. The count value of the V counter is incremented at the leading edge of the horizontal sync signal HSYNC. The count value of the V counter is transmitted as a coordinate DY.

Figure 9:
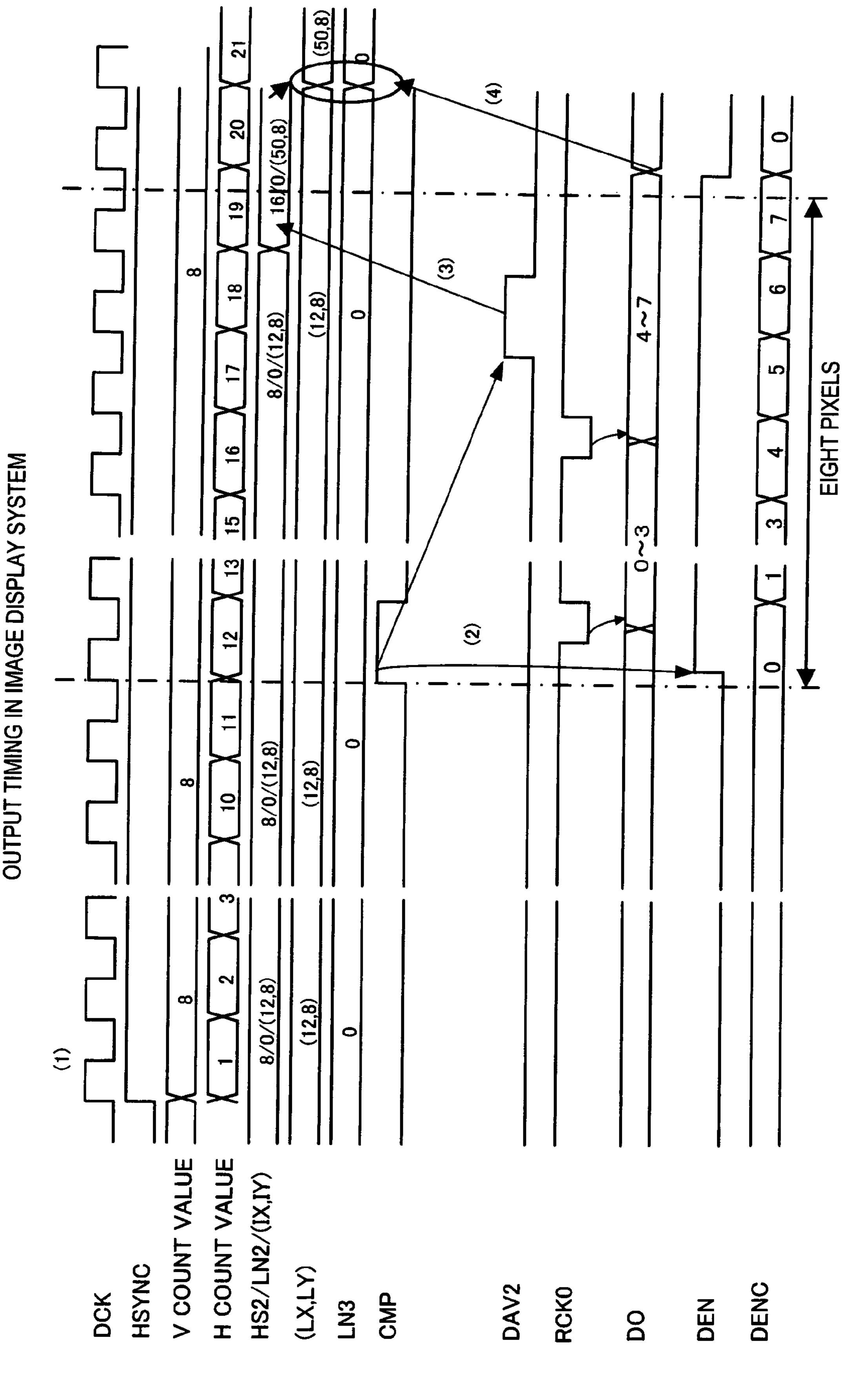
FIG. 9 is a timing chart indicating output timings in an image display system.

On the other hand, the H counter is, as shown in FIG. 9, reset when the horizontal sync signal HSYNC is driven low. The count value of the H counter is incremented at the leading edge of the display clock DCK. The count value of the H counter is transmitted as a coordinate DX.

The comparator 43 compares the coordinates (LX,LY) sent from the coordinate data holder 41 with the coordinates (DX, DY) sent from the frame image data scanned position generator 42. When the coordinates are consistent with the other ones, the consistence signal CMP is driven high.

The output enabling signal counter 44 receives the second horizontal size HS2 sent from the second arrangement data holder 32 and the consistence signal CMP sent from the comparator 43, and transmits the output enabling signal DEN. When the consistence signal CMP goes high, the output enabling signal counter 44 drives the output enabling signal DEN to a high level. Moreover, the output enabling signal counter 44 counts the number of display clocks DCK. The output enabling signal DEN remains high until the number of display clocks DCK reaches the number of pixels corresponding to the second horizontal size HS2.

Next, transmission to be performed by the image display system 1 will be described in conjunction with FIG. 9.

Prior to transmission, the vertical sync signal VSYNC is driven low, though it is not shown. The second arrangement data holder 32 holds the second line number LN2, second horizontal size HS2, and coordinates (IX,IY). Herein, the second line number LN2 is 0, the second horizontal size HS2 is 8, and the coordinates (IX,IY) are (12,8) (see FIG. 4).

At timing (1), the count value of the V counter is 8. The count value of the V counter is incremented synchronously with every display clock DCK.

At timing (2), the count value of the H counter reaches 12. The FIFO memory reading controller 34 transmits a read signal RCK0 that instructs reading of data from the FIFO memory 0 determined based on the third line number LN3 of 0. The output selection unit 50 selects the output data DO sent from the FIFO memory 0, and transmits the output data as the output data DO. The output data DO has each pixel thereof transmitted synchronously with the display clock DCK from a shift circuit that is not shown.

The consistence signal CMP sent from the comparator 43 is driven high. Accordingly, the output enabling signal DEN sent from the output enabling signal counter 44 is driven high. Furthermore, the output enabling signal counter 44 holds the high-level output enabling signal DEN during a period during which the number of pixels falls below eight pixels corresponding to the second horizontal size HS2.

On the other hand, when the correspondence signal CMP is driven high, the second arrangement data reference pointer 31 transmits the address PA2 and requests the memory controller 2 to read the next arrangement data PI. When the second arrangement data PI2 is validated, the memory controller 2 drives a data validation signal DAV2 to a high level. The second arrangement data holder 32 holds the second arrangement data PI2 according to the data validation signal DAV2.

At timing (3), the second horizontal size HS2, second line number LN2, and coordinates (IX,IY) sent from the second arrangement data holder 32 are undated to 16, 0, and (50,8) respectively.

At timing (4), as soon as the output enabling signal counter 44 counts the number of display clocks DCK corresponding to eight pixels, the output enabling signal DEN is driven to low. Along with the high-to-low transition of the output enabling signal DEN, the coordinate data holder 41 updates the coordinates (IX, IY). The line number holder 33 updates the third line number LN3.

Next, the flow of font data items FD0 and FD1 that represent characters to be superimposed on part of a frame image FP by the image display system 1 in accordance with the present embodiment will be described with reference to FIG. 10.

To begin with, at timings (1) to (4), font data FD0 is, as described in conjunction with FIG. 6, stored in the FIFO memories, which are selected with the line numbers LN, in units of unit transfer data RDATA by referencing arrangement data items PI. Specifically, a line of pixels included in the font data FD0 and assigned the line number LN=0 is transferred to the FIFO memory 0 through burst transmission. A line of pixels included therein and assigned the line number LN=1 is transferred to the FIFO memory 1 through burst transmission. A line of pixels included therein and assigned the line number LN=2 is transferred to the FIFO memory 2 through burst transmission. A line of pixels included therein and assigned the line number LN=3 is transferred to the FIFO memory 3 through burst transmission. Since a line of pixels to be contained in each scanning line includes eight pixels, the line of pixels is bisected and stored in the FIFO memories in units of four pixels (see FIG. 6).

At timings (5) to (8), the font data FD1 is, similarly to the font data FD0, stored in the FIFO memories, which are selected based on the line numbers LN, in units of unit transfer data RDATA by referencing the arrangement data items PI. Specifically, a line of pixels included in the font data FD0 and assigned the line number LN=0 is transferred to the FIFO memory 0 through burst transmission. A line of pixels included therein and assigned the line number LN=1 is transferred to the FIFO memory 1 through burst transmission. A line of pixels included therein and assigned the line number LN=2 is transferred to the FIFO memory 2 through burst transmission. A line of pixels included therein and assigned the line number LN=3 is transferred to the FIFO memory 3 through burst transmission. Since a line of pixels to be contained in each scanning line includes sixteen pixels, the line of pixels is quartered and stored in the FIFO memories in units of four pixels (see FIG. 7).

In the image display system 1 according to the present invention, the unit transfer data RDATA is transferred to a FIFO memory, which is selected with the line number LN assigned to a line of pixels to be contained in a scanning line, through burst transmission. Consequently, if pixels to be contained in a plurality of scanning lines are transferred to the FIFO memories during each burst transmission, the unit transfer data items RDATA are stored in the FIFO memories selected with the line numbers LN assigned to lines of pixels to be contained in scanning lines. When the unit transfer data is superimposed on first raster image data, the FIFO memory is selected based on the line number LN assigned to a line of pixels to be transmitted and to be contained in a scanning line. Consequently, the resultant image is displayed accurately. According to the present invention, the FIFO memories are included as a means in which the unit transfer data items RDATA are stored. The image display system 1 can superimpose characters, which are represented by the unit transfer data items, on a frame image FP without the need of complex control, that is, the necessity of resorting lines of pixels fetched from the FIFO memories.

Figure 10:
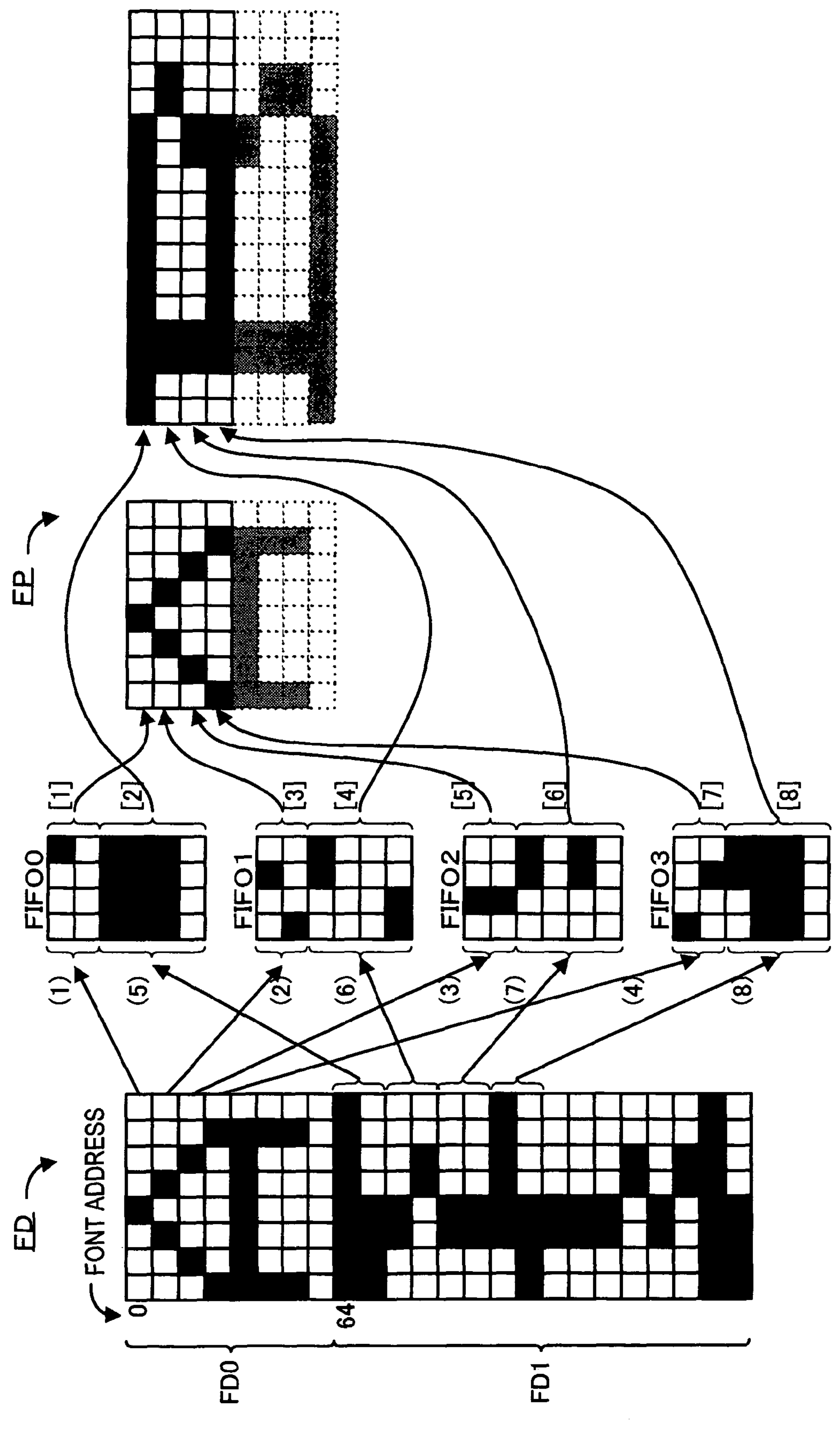
FIG. 10 is a data flowchart showing a flow of font data in the image display system.

Referring to FIG. 10, the image display system 1 in accordance with the present embodiment transmits the stored unit transfer data items RDATA by following steps [1] to [8].

At step [1], the arrangement data PI located at the leading address in the arrangement data table PIT is referenced to retrieve 0 as the line number LN and 8 as the horizontal size HS. Part of a character represented by eight pixels read from the FIFO memory 0 is superimposed on a frame image FP. At step [2], the arrangement data PI located at the second address in the arrangement data table PIT is referenced to retrieve 0 as the line number LN and 16 as the horizontal size HS. Part of a character represented by sixteen pixels read from the FIFO memory is superimposed on the frame image FP. Likewise, at steps [3] to [8], the arrangement data table PIT is referenced to retrieve the line number LN and horizontal size HS, and parts of a character represented by pixels read from the respective FIFO memories are superimposed on the frame image FP.

In the image display system 1 according to the present invention, when font data FD is transferred to the FIFO memories through burst transmission, and when a character represented by the font data FD stored in the FIFO memories is superimposed on a frame memory FP, the same arrangement data table PIT is referenced. Thus, since the one arrangement data table alone is needed, the area in the SDRAM 3 can be efficiently used.

Noted is that the present invention is not limited to the embodiment. Needless to say, the present invention can be improved or modified in various manners without a departure from the gist of the present invention.

For example, in the input control unit 20, the count value of the first counter 21 is initialized to 0 with every burst transmission, and is incremented synchronously with every data transfer clock SCK. The line count value LNC is compared with the size ratio HSV in order to determine the number of transfer data items. Alternatively, the count value of the first counter 21 may be initialized to the value of the size ratio HSV for every burst transmission, and decremented synchronously with every data transfer clock SCK. The output of the first counter 21 may be checked to see if it is 0.

A frame image FP is an example of an image represented by first raster image data, and font data FD is an example of second raster image data. The first arrangement data holder 12 is an example of the first line identification signal holder or first number-of-pixels signal holder. The FIFO memory writing controller 22 is an example of a second counter, and the output enabling signal counter 44 is an example of a third counter.

When the present invention is applied, there are provided an image display system and a control method for the image display system making it possible to improve a throughput of burst transmission from an SDRAM and to simplify control of FIFO memories.

What is claimed is:

1. An image display system in which a plurality of unit transfer data each of which corresponds to one of scanning lines included in second raster image data to be superimposed on part of first raster image data which represents an image to be displayed during one frame, or each of which corresponds to one of n portions into which one of the scanning lines is divided, are received based on an input enabling signal through burst transmission, comprising:

FIFO memories numbering the same as the scanning lines, which are received through one burst transmission, included in the second raster image data; and an input control unit that stores the unit transfer data in the FIFO memory selected based on a line number assigned to the scanning line.

2. The image display system according to claim 1, wherein the input control unit includes a first counter whose count value is incremented every time the line number is updated, and a FIFO memory is identified based on the count value of the first counter.

3. The image display system according to claim 2, further comprising:

a data array that, when at least one second raster image data is superimposed on the first raster image data, has data items including line number identification data, with which a line number assigned to the scanning line included in the second raster image data is identified, arrayed in the order that the first raster image data are scanned;

a first data retrieval unit that, every time the scanning line is received, retrieves the data items from the data array, and sends the line number identification data among the data items included in the data array; and a first line number identification signal holder that, when the line number identification data sent from the first data retrieval unit is a line number assigned to the scanning line corresponding to the unit transfer data that is transferred first during burst transmission, holds the line number identification data as a first line number identification signal, wherein:

every time the first line number identification signal is updated, the count value of the first counter is initialized;

based on the count value of the first counter or based on the count value of the first counter and the first line number identification signal, the input control unit selects one of the FIFO memories and stores the second raster image data in the selected FIFO memory.

4. The image display system according to claim 3, wherein:

every time the first line number identification signal is updated, the count value of the first counter is initialized to 0; and the input control unit includes an adder that adds up the count value of the first counter and the first line number identification signal, wherein the input control unit selects one of the FIFO memories according to the result of addition performed by the adder, and stores the second raster image data in the selected FIFO memory.

5. The image display system according to claim 3, wherein:

the data array further includes information on the number of pixels belonging to each scanning line included in the second raster image data;

the first data retrieval unit includes a first number-of-pixels signal holder that, when the line number identification data sent from the first data retrieval unit is a line number assigned to the scanning line that corresponds to the unit transfer data which is transferred first during burst transmission, holds the information on the number of pixels as a first number-of-pixels signal;

the input control unit includes a second counter that counts the number of transfer clocks synchronously with which burst transmission is performed; and every time the count value of the second counter exceeds an output value calculated by dividing the number of pixels, which is contained in the scanning line and represented by the first number-of-pixels signal, by the number of pixels included in the unit transfer data, the selected FIFO memory is updated.

6. The image display system according to claim 1, further comprising:

a data array that, when at least one second raster image data is superimposed on the first raster image data, has data items including line number identification data, with which a line number assigned to the scanning line included in the second raster image data is identified, arrayed in the order that the first raster image data are scanned; and a second data retrieval unit that, every time the scanning line is sent, retrieves the data items from the data array, and sends the line number identification data among the data items included in the data array; and an output control unit that selects one of the FIFO memories according to the line number identification data and sends the unit transfer data.

7. The image display system according to claim 6, wherein:

the data array further includes information on the number of pixels belonging to each scanning line included in the second raster image data;

the second data retrieval unit retrieves the information on the number of pixels, and transmits it as a second number-of-pixels signal;

the output control unit includes a third counter that sends the unit transfer data synchronously with an output clock, and counts the number of output clocks, and a second arithmetic block that divides the number of pixels, which is contained in the scanning line, by the number of pixels, represented by a second number-of-pixels signal which is the information on the number of pixels, included in the unit transfer data; and every time the count value of the third counter exceeds the output value of the second arithmetic block, the selected FIFO memory is updated.

8. The image display system according to claim 1, further comprising a FIFO memory remaining area check unit that checks the FIFO memory to see if it has a remaining area large enough to receive data transferred through burst transmission, and that, when the FIFO memory has the remaining area activates the input enabling signal.

9. The image display system according to claim 8, further comprising:

a remaining capacity data arithmetic unit that calculates remaining FIFO capacity data showing whether the FIFO memory remaining area is enough according to a difference between write addresses and read addresses, at which data are stored; and based on the remaining FIFO capacity data of a FIFO memory, in which the last unit transfer data that is received during burst transmission is stored, and based on number of the unit transfer data that constitute the scanning line being received during burst transmission, the FIFO remaining area check unit determines whether the burst transmission is enabled.

10. The image display system according to claim 1, wherein the maximum number of FIFO memories is equal to the sum of each the number of the unit transfer data constitute in each the scanning line and that are included in the second raster image data continually arranged in the direction of scanning lines forming the frame.

11. A control method for an image display system comprising:

transferring a plurality of unit transfer data, each of which corresponds to one of scanning lines included in second raster image data to be superimposed on part of first raster image data which represents an image to be displayed during one frame, or each of which corresponds to one of n portions into which one of the scanning lines is divided, through burst transmission; and storing the unit transfer data in a FIFO memory selected with a line number assigned to each of the scanning lines, which are received through one burst transmission, included in the second raster image data.

12. The control method for an image display system according to claim 11, wherein the storing the unit transfer data includes counting a count value every time the line number is updated, and identifying a FIFO memory according to the result of the counting.

* * * * *